(12) United States Patent
Shitamichi et al.

(10) Patent No.: US 9,825,272 B2
(45) Date of Patent: Nov. 21, 2017

(54) WIRING MODULE

(71) Applicant: SUMITOMO WIRING SYSTEMS, LTD., Yokkaichi, Mie (JP)

(72) Inventors: Masaru Shitamichi, Yokkaichi (JP); Yoshinao Kobayashi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 165 days.

(21) Appl. No.: 14/897,141

(22) PCT Filed: Jun. 2, 2014

(86) PCT No.: PCT/JP2014/064609
§ 371 (c)(1),
(2) Date: Dec. 9, 2015

(87) PCT Pub. No.: WO2014/203713
PCT Pub. Date: Dec. 24, 2014

(65) Prior Publication Data
US 2016/0133907 A1    May 12, 2016

(30) Foreign Application Priority Data

Jun. 18, 2013 (JP) ................................ 2013-127908

(51) Int. Cl.
*H01M 2/20* (2006.01)
*H01M 2/10* (2006.01)
(Continued)

(52) U.S. Cl.
CPC .............. *H01M 2/206* (2013.01); *H01G 4/38* (2013.01); *H01M 2/1077* (2013.01);
(Continued)

(58) Field of Classification Search
CPC ........ H01R 13/60; H01R 13/42; H01R 13/44; H01M 2/10; H01M 10/48; H01M 2/20
(Continued)

(56) References Cited

U.S. PATENT DOCUMENTS 6,261,719 B1 * 7/2001 Ikeda ..................... H01M 2/202
429/120
6,399,238 B1 * 6/2002 Oweis ................. H01M 2/1077
429/100
(Continued)

FOREIGN PATENT DOCUMENTS

| JP | H09-88927 A | 3/1997 |
|---|---|---|
| JP | 2013-097896 A | 5/2013 |

(Continued)

OTHER PUBLICATIONS

Jul. 1, 2014 Search Report issued in International Patent Application No. PCT/JP2014/064609.

*Primary Examiner* — Alexander Gilman
(74) *Attorney, Agent, or Firm* — Oliff PLC

(57) ABSTRACT

Provided is a wiring module configured to be attached to a power storage device group in which a plurality of power storage devices are lined up, the wiring module including a voltage detection wire to be connected to at least one of the plurality of power storage devices. An insulation protector is configured with an engagement receiving portion. A detection wire cover covers the voltage detection wire and includes a cover engagement portion that engages with the engagement receiving portion. A cover support portion is formed in the insulation protector, the cover support portion abutting against the detection wire cover from a direction opposite to a disengagement direction in which the engagement portion and the engagement receiving portion disen-
(Continued)

gage from each other, when a force is applied to the detection wire cover in the disengagement direction.

11 Claims, 8 Drawing Sheets

(51) Int. Cl.
    *H01M 10/48*     (2006.01)
    *H01G 4/38*     (2006.01)
    *H01G 11/10*     (2013.01)
    *H01G 11/76*     (2013.01)

(52) U.S. Cl.
    CPC .......... *H01M 10/482* (2013.01); *H01G 11/10* (2013.01); *H01G 11/76* (2013.01); *H01M 2220/20* (2013.01)

(58) Field of Classification Search
    USPC .......... 439/636, 142, 627, 676; 429/158–160
    See application file for complete search history.

(56) References Cited

U.S. PATENT DOCUMENTS

| | | | |
|---|---|---|---|
| 7,740,981 B2* | 6/2010 | Hashida | H01M 2/1077 429/158 |
| 8,859,134 B2* | 10/2014 | Ikeda | H01M 2/1077 429/158 |
| 9,397,417 B2* | 7/2016 | Nakayama | H01G 4/38 |
| 9,526,187 B2* | 12/2016 | Nakayama | H01M 2/206 |
| 2001/0046816 A1* | 11/2001 | Saito | H01M 2/206 439/736 |
| 2002/0102457 A1* | 8/2002 | Oogami | B60L 3/0046 429/159 |
| 2011/0008669 A1* | 1/2011 | Ogasawara | H01M 2/1072 429/160 |
| 2011/0045329 A1* | 2/2011 | Ikeda | H01M 2/206 429/91 |
| 2011/0064986 A1* | 3/2011 | Ogasawara | H01M 2/206 429/121 |
| 2012/0164509 A1* | 6/2012 | Ogasawara | H01R 9/226 429/121 |
| 2012/0183833 A1* | 7/2012 | Ikeda | H01M 2/1077 429/121 |
| 2012/0231638 A1* | 9/2012 | Ikeda | H01M 2/206 439/77 |
| 2012/0328920 A1* | 12/2012 | Takase | H01M 2/1077 429/90 |
| 2013/0052516 A1* | 2/2013 | Kim | H01M 2/1016 429/159 |
| 2013/0071721 A1* | 3/2013 | Ogasawara | H01M 2/1077 429/151 |
| 2013/0196521 A1* | 8/2013 | Ogasawara | H01M 2/206 439/135 |
| 2013/0309553 A1* | 11/2013 | Kinoshita | H01M 2/1077 429/158 |
| 2014/0017553 A1* | 1/2014 | Kikuchi | H01M 2/206 429/159 |
| 2014/0065468 A1* | 3/2014 | Nakayama | H01M 2/206 429/160 |
| 2014/0113494 A1* | 4/2014 | Kinoshita | H01M 2/1061 439/627 |
| 2014/0134894 A1* | 5/2014 | Kinoshita | H01M 2/1077 439/754 |
| 2014/0256178 A1* | 9/2014 | Kinoshita | H01R 13/60 439/529 |
| 2014/0287622 A1* | 9/2014 | Kinoshita | H01M 2/206 439/595 |
| 2014/0308560 A1* | 10/2014 | Takishita | H01M 2/206 429/121 |
| 2014/0311768 A1* | 10/2014 | Takishita | H01R 13/447 174/66 |
| 2014/0315441 A1* | 10/2014 | Kinoshita | H01M 2/1077 439/627 |
| 2014/0329136 A1* | 11/2014 | Kinoshita | H01M 2/206 429/158 |
| 2014/0329413 A1* | 11/2014 | Ogasawara | H01M 2/043 439/627 |
| 2015/0118875 A1* | 4/2015 | Liu | H01M 2/202 439/142 |
| 2015/0125727 A1* | 5/2015 | Lui | H01M 2/206 429/90 |
| 2015/0140392 A1* | 5/2015 | Liu | H01M 2/204 429/121 |
| 2015/0171403 A1* | 6/2015 | Liu | H01M 2/206 429/121 |
| 2015/0357620 A1* | 12/2015 | Nakayama | H01M 2/206 429/90 |
| 2016/0133907 A1* | 5/2016 | Shitamichi | H01M 2/1077 429/121 |
| 2016/0197330 A1* | 7/2016 | Takase | H01M 2/206 429/92 |

FOREIGN PATENT DOCUMENTS

| | | |
|---|---|---|
| JP | 2013-097962 A | 5/2013 |
| JP | 2013-105572 A | 5/2013 |
| JP | 2013-105587 A | 5/2013 |
| JP | 2013-157119 A | 8/2013 |
| JP | 2013-162569 A | 8/2013 |
| WO | 2013/061871 A1 | 5/2013 |
| WO | 2013/069525 A1 | 5/2013 |
| WO | 2013/069527 A1 | 5/2013 |

* cited by examiner

WIRING MODULE

TECHNICAL FIELD

The present disclosure relates to a wiring module.

BACKGROUND ART

Conventionally, a wiring module to be attached to a power storage device group in which a plurality of power storage devices are lined up is known. In this wiring module, a conductive member is accommodated in an opening provided in an insulation protector. A cover is attached to the opening of the insulation protector. The conductive member accommodated in the opening is covered by this cover.

The insulation protector and the cover are assembled into a single body by a cover engagement receiving portion formed in the resin protector and a cover engagement portion formed in the cover engaging with each other. Such a locking structure is known as the locking structure disclosed in Patent Document 1.

CITATION LIST

Patent Document

Patent Document 1: JP H9-88927A

SUMMARY

Technical Problem

With the above-described configuration, it is feared that if a force is applied to the cover in a disengagement direction in which the cover engagement portion and the cover engagement receiving portion disengage from each other, the cover may move in the disengagement direction, resulting in disengagement of the cover engagement portion and the cover engagement receiving portion and hence detachment of the cover from the insulation protector.

Present embodiments were made in view of circumstances such as those described above, and it is an object thereof to provide a wiring module in which detachment of a cover from an insulation protector is suppressed.

Solution to Problem

A wiring module according to a preferred embodiment is a wiring module to be attached to a power storage device group in which a plurality of power storage devices are lined up, the wiring module including a conductive member to be connected to at least one of the plurality of power storage devices, an insulation protector that has an opening in which the conductive member is accommodated and that includes a cover engagement receiving portion, and a cover that is attached to the insulation protector and covers the conductive member and that includes a cover engagement portion that engages with the cover engagement receiving portion, wherein a cover support portion is formed in the insulation protector, the cover support portion abutting against the cover from a direction opposite to a disengagement direction in which the cover engagement portion and the cover engagement receiving portion disengage from each other, when a force is applied to the cover in the disengagement direction.

According to a preferred embodiment, movement of the cover in the disengagement direction, in which the cover engagement portion and the cover engagement receiving portion disengage from each other, can be suppressed. Accordingly, disengagement of the cover engagement portion and the cover engagement receiving portion is suppressed, and thus detachment of the cover from the insulation protector can be suppressed.

The following modes for carrying out preferred embodiments are preferable. It is preferable that an abutment rib is formed in a portion of the cover that opposes the cover support portion, the abutment rib extending in a direction that intersects the disengagement direction and abutting against the cover support portion when a force is applied to the cover in the disengagement direction.

According to the above-described mode, when a force is applied to the cover in the disengagement direction, in which the cover engagement portion and the cover engagement receiving portion disengage from each other, the abutment rib formed in the cover abuts against the cover support portion. This abutment rib can suppress deformation of the cover when the cover abuts against the cover support portion. As a result, disengagement of the cover engagement portion and the cover engagement receiving portion due to deformation of the cover is suppressed, and thus detachment of the cover from the insulation protector can be suppressed even more.

It is preferable that, in a state in which no force is applied to the cover in the disengagement direction, a clearance is formed between the cover support portion and the abutment rib, and a size of the clearance is set to be smaller than an engagement margin between the cover engagement portion and the cover engagement receiving portion.

According to the above-described mode, in a state in which no force is applied to the cover in the disengagement direction, the clearance is formed between the cover support portion and the abutment rib, and thus the cover and the insulation protector can be easily assembled together.

On the other hand, if a force is applied to the cover in the disengagement direction, the cover moves toward the cover support portion for a distance corresponding to the clearance. Then, the cover support portion and the abutment rib abut against each other. At this time, since the size of the clearance is set to be smaller than the engagement margin between the cover engagement portion and the cover engagement receiving portion, disengagement of the cover engagement portion and the cover engagement receiving portion is suppressed even in the state in which the cover support portion and the abutment rib abut against each other.

It is preferable that an intersecting wall intersecting the disengagement direction is provided in the insulation protector at a position forward of the cover engagement receiving portion with respect to the disengagement direction, and the cover support portion is formed in the intersecting wall.

According to the above-described mode, since the cover support portion is formed at a position forward of the cover engagement receiving portion with respect to the disengagement direction, even if a force is applied to the cover in the disengagement direction and causes the cover and the cover support portion to abut against each other, deformation of the cover engagement receiving portion under the force can be reliably suppressed. Accordingly, disengagement of the cover engagement portion and the cover engagement receiving portion is reliably suppressed, and thus detachment of the cover from the insulation protector can be reliably suppressed.

It is preferable that a notch is provided in the intersecting wall, a fitting portion to be fitted into the notch is provided in the cover, and a lip abutment rib is formed in the fitting portion, the lip abutment rib extending in the disengagement direction and abutting against at least one of a pair of lip portions constituting the notch of the intersecting wall when a force is applied to the cover in a direction that intersects the disengagement direction.

According to the above-described mode, when a force is applied to the cover in the direction that intersects the disengagement direction, movement of the cover in the direction that intersects the disengagement direction is suppressed. Accordingly, application of the force to the cover engagement portion and the cover engagement receiving portion is suppressed, and thus disengagement of the cover engagement portion and the cover engagement receiving portion is suppressed.

It is also possible to adopt a configuration in which the conductive member is a voltage detection wire that detects a voltage of at least one of the plurality of power storage devices.

According to the above-described mode, the voltage detection wire is covered by the cover, and thus protrusion of the voltage detection wire from the insulation protector is suppressed.

It is preferable that the insulation protector and the cover are formed integrally with each other via a hinge.

According to the above-described mode, the number of components of the wiring module can be reduced.

It is preferable that the insulation protector has a plurality of joint units each having a joint portion, the resin protector is formed by the plurality of joint units being joined together by the joint portions in a direction in which the plurality of power storage devices are lined up, and the cover engagement portion and the cover support portion are formed in each of the plurality of joint units.

According to the above-described mode, the cover is locked by the cover engagement portion that is formed in each joint unit, and also movement of the cover in a direction in which it detaches from the insulation protector is suppressed by the cover support portion that is formed in each joint unit. Accordingly, the cover is reliably locked at a plurality of positions, and thus detachment of the cover from the insulation protector can be reliably suppressed.

Advantages

According to aspects of preferred embodiments, detachment of the cover from the insulation protector can be suppressed.

DESCRIPTION OF EMBODIMENTS

Embodiment 1

Figure 1:
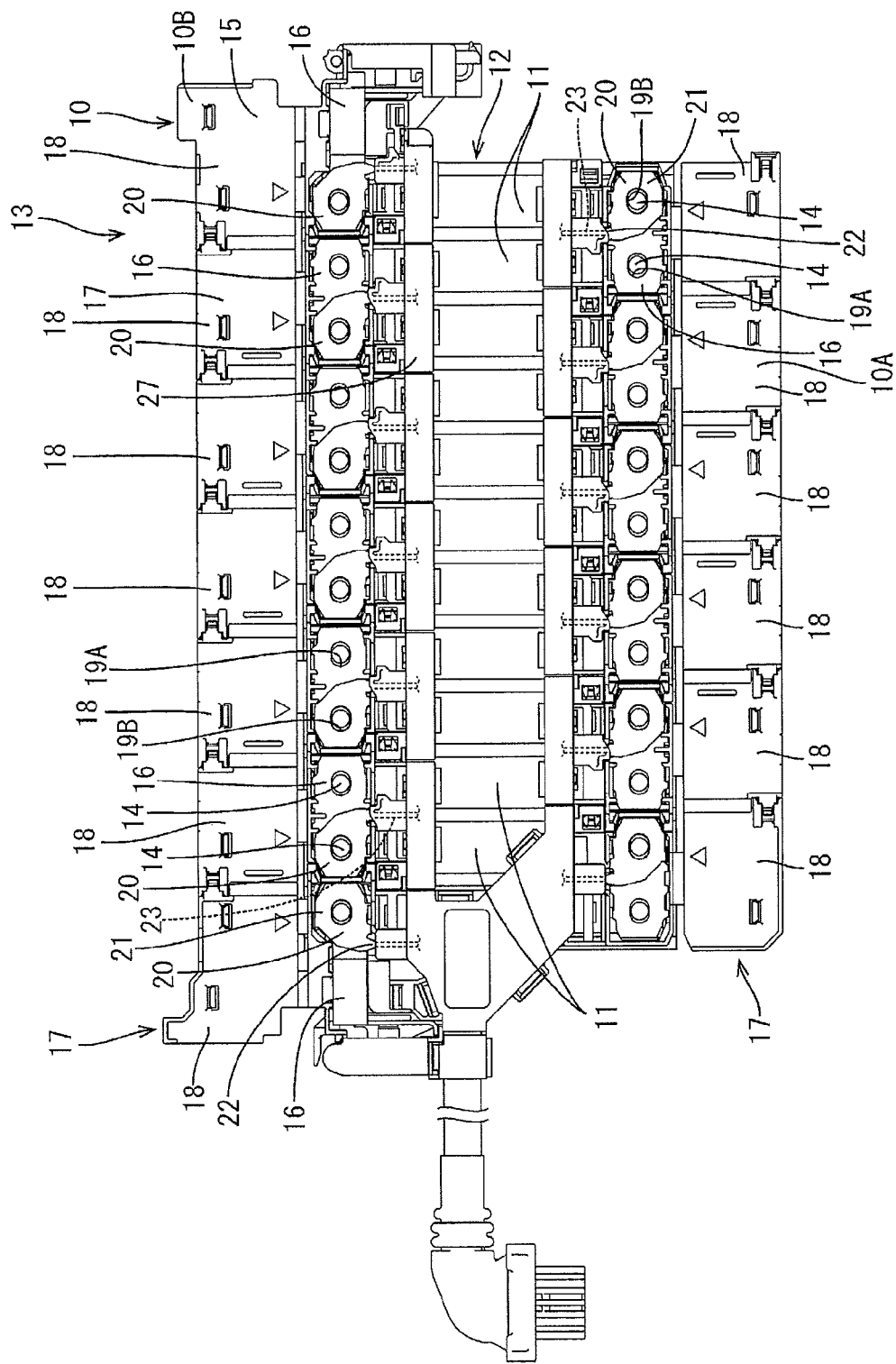
FIG. 1 is a plan view showing a power storage module according to Embodiment 1.

Embodiment 1 will be described with reference to FIGS. 1 to 9. As shown in FIG. 1, a wiring module 10 according to the present embodiment is attached to a power storage device group 12 in which a plurality of (twelve, in the present embodiment) power storage devices 11 are lined up, and constitutes a power storage module 13. The power storage module 13 is installed in a vehicle (not shown) such as an electric vehicle or a hybrid vehicle, and is used as a power source for driving the vehicle.

Figure 4:
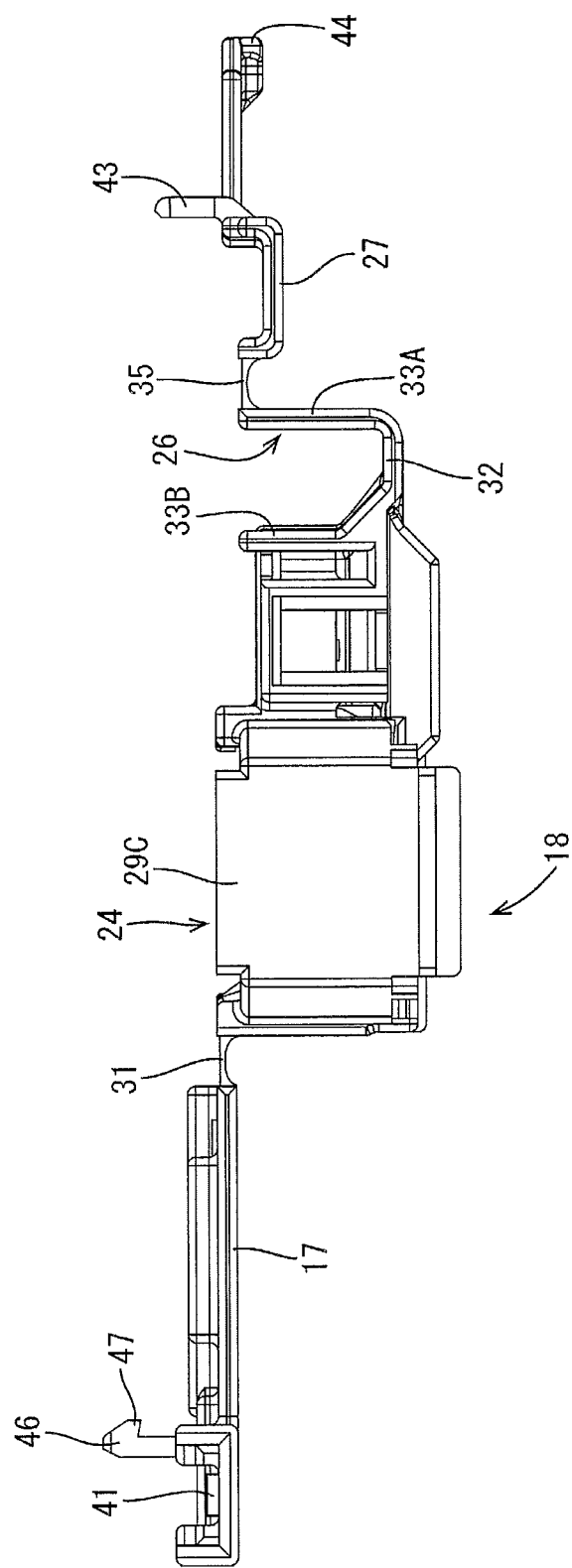
FIG. 4 is a side view showing the joint unit.

In the following description, the left side and the right side in FIG. 1 are referred to as "left side" and "right side", respectively. Also, the lower side and the upper side in FIG. 1 are referred to as "front side" and "rear side", respectively. Moreover, the upper side and the lower side in FIG. 4 are referred to as "upper side" and "lower side", respectively. In the following description, when a plurality of identical members are present, only one of those members may be denoted by a reference numeral, and the reference numeral may be omitted with respect to the remaining members.

Power Storage Device 11

The power storage devices 11 according to the present embodiment are secondary batteries. A power storage element, which is not shown, is accommodated within each power storage device 11. The power storage devices 11 each may have a substantially rectangular parallelepiped shape. A pair of electrode terminals 14 are formed protruding upward from respective positions on an upper surface of each power storage device 11 that are near opposite end portions of that surface. One of these electrode terminals 14 is a positive electrode terminal, and the other of these electrode terminals 14 is a negative electrode terminal. The power storage devices 11 are arranged in such a manner that adjacent electrode terminals 14 have different polarities. The plurality of power storage devices 11 are lined up in a left-right direction and constitute the power storage device group 12.

Wiring Module 10

The wiring module 10 is attached to an upper surface of the power storage device group 12. The wiring module 10 has a shape that is elongated in the left-right direction. The wiring module 10 according to the present embodiment is constituted by a front wiring module 10A that is disposed in a position near a front end portion of the power storage device group 12 and a rear wiring module 10B that is disposed in a position near a rear end portion of the power storage device group 12, the front and rear wiring modules 10A and 10B being connected to each other in a front-rear direction.

The wiring module 10 includes an insulation protector 15, a plurality of voltage detection wires 23 (an example of a conductive member) that are accommodated in the insulation protector 15, and a detection wire cover 27 (an example of a cover) that is attached to the insulation protector 15 and covers the voltage detection wires 23 from above. Moreover, a plurality of busbars 16 are accommodated in the wiring module 10.

Insulation Protector 15

The insulation protector 15 has a plurality of joint units 18 made of a synthetic resin having insulating properties. In the present embodiment, the insulation protector 15 constituting the front wiring module 10A is formed by six joint units 18 that are joined together in the left-right direction. Also, the insulation protector 15 constituting the rear wiring module 10B is formed by seven joint units 18 that are joined together in the left-right direction. The plurality of joint units 18 are joined together in a direction in which the plurality of power storage devices 11 are lined up in the power storage device group 12.

Busbar 16

The busbars 16 are each formed by pressing a metal plate material into a predetermined shape. Any metal, including copper, a copper alloy, iron, an iron alloy, aluminum, an aluminum alloy, and the like, can be appropriately selected for the metal plate material as necessary. The busbars 16 have a shape that is elongated in the left-right direction when viewed from above. In each busbar 16, a terminal through-hole 19A in which a corresponding electrode terminal 14 is inserted is formed passing through that busbar 16. The electrode terminal 14 and the busbar 16 are electrically connected to each other by passing the electrode terminal 14 through the terminal through-hole 19A and, in this state, screwing a nut (not shown) onto the electrode terminal 14 on which a screw thread is formed.

Voltage Detection Terminal 20

Voltage detection terminals 20 are placed on top of the respective busbars 16, and detect the voltage of the corresponding power storage devices 11. Each voltage detection terminal 20 is formed by pressing a metal plate material into a predetermined shape. Any metal, including copper, a copper alloy, iron, an iron ally, aluminum, an aluminum alloy, and the like, can be appropriately selected for the metal plate material as necessary. The voltage detection terminals 20 each include an electrode connecting portion 21 having a plate-like shape and a barrel portion 22 extended therefrom in such a manner as to have a shape that is offset from the electrode connecting portion 21.

A terminal through-hole 19B in which a corresponding electrode terminal 14 is inserted is formed in each electrode connecting portion 21. On one of the adjacent electrode terminals 14 that are connected to each other by a single busbar 16, the voltage detection terminal 20 is sandwiched between the busbar 16 and the nut (not shown) and is thus electrically connected to the electrode terminals 14.

One end portion of each voltage detection wire 23 is crimped onto the corresponding barrel portion 22. The other end portions of the voltage detection wires 23 are connected to an external connection device (not shown) such as an ECU, for example. The barrel portion 22 is extended from a lateral side of the corresponding electrode connecting portion 21.

Joint Unit 18

Figure 2:
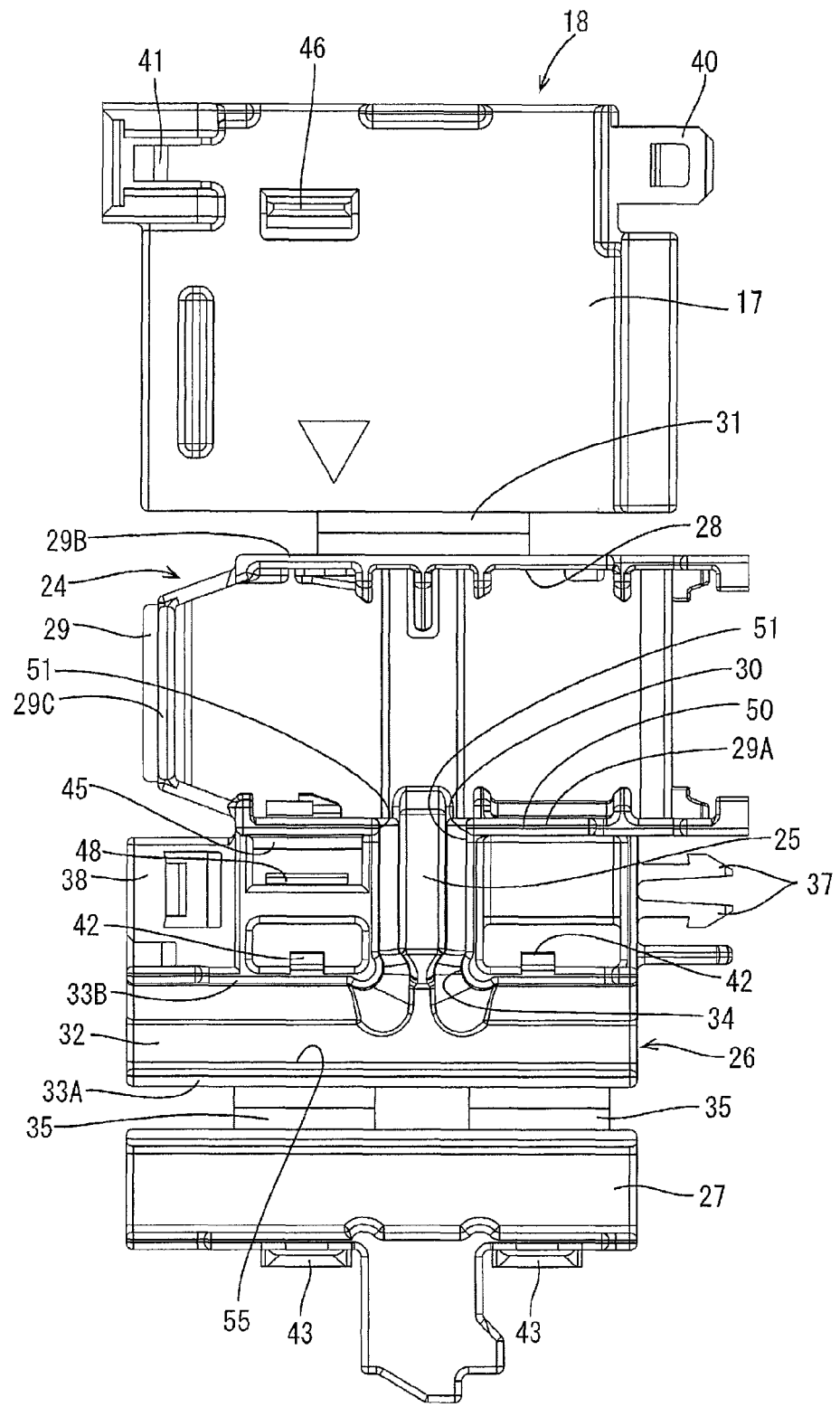
FIG. 2 is a plan view showing a joint unit.

As shown in FIG. 2, each joint unit 18 is made of a synthetic resin, and includes an accommodating portion 24 in which the corresponding busbar 16 and voltage detection terminal 20 are accommodated, a busbar cover 17 that covers the accommodating portion 24 from above, a barrel holding portion 25 that holds the barrel portion 22 of the voltage detection terminal 20 that is led out from the accommodating portion 24, a detection wire routing groove 26 in which the voltage detection wires 23 are routed, and a detection wire cover 27 that covers the detection wire routing groove 26 from above.

As shown in FIG. 2, the accommodating portion 24 has a generally rectangular shape that is elongated in the left-right direction when viewed from above, and this shape is slightly larger than the shape of the busbar 16. An opening 28 that opens upward is formed in the accommodating portion 24, and the busbar 16 and the voltage detection terminal 20 are accommodated in this opening 28.

As shown in FIG. 2, the accommodating portion 24 has a peripheral wall 29 that is disposed on lateral sides of the busbar 16. One side of the peripheral wall 29 with respect to the left-right direction is open. The peripheral wall 29 includes a first peripheral wall 29A that is located on the barrel holding portion 25 side, a second peripheral wall 29B that opposes the first peripheral wall 29A, and a third peripheral wall 29C that joins the left end of the first peripheral wall 29A and the left end of the second peripheral wall 29B to each other. In the present embodiment, the right side of the peripheral wall 29 is open in FIG. 2.

When the plurality of joint units 18 are joined together, the open portion of the peripheral wall 29 is closed by the third peripheral wall 29C of an adjoining joint unit 18. Thus, in a state in which the plurality of joint units 18 are joined together, the periphery of each busbar 16 is surrounded by the first peripheral wall 29A, the second peripheral wall 29B, and the third peripheral wall 29C of the joint unit 18 in which that busbar 16 is accommodated as well as the third peripheral wall 29C of an adjoining joint unit 18.

In the first peripheral wall 29A, a rear notch 30 (an example of a notch) through which the barrel portion 22 is led out is formed at a position corresponding to the barrel holding portion 25. The rear notch 30 is continuous with a rear end portion (upper end portion in FIG. 2) of the barrel holding portion 25. The barrel holding portion 25 is formed into a groove shape that opens upward.

The busbar cover 17 is joined to an outer wall of the second peripheral wall 29B via a busbar cover hinge 31. The busbar cover 17 is configured to be rotated about the busbar cover hinge 31, thereby covering the accommodating portion 24 from above. Thus, the busbar cover 17 covers the busbar 16 accommodated in the opening 28 of the accommodating portion 24 from above.

A front end portion (lower end portion in FIG. 2) of the barrel holding portion 25 is in communication with the detection wire routing groove 26 in which the voltage detection wires 23 are accommodated. The detection wire routing groove 26 has an opening 55 that opens upward. The detection wire routing groove 26 includes a bottom wall 32 extending in the left-right direction and a front wall 33A and a rear wall 33B rising upward from front and rear end portions, respectively, of the bottom wall 32 and extending in the left-right direction. The front wall 33A is located on the front side with respect to the bottom wall 32, and the rear wall 33B is located on the rear side with respect to the bottom wall 32. In the front wall 33A, a front notch 34 through which a corresponding voltage detection wire 23 is led into the detection wire routing groove 26 is formed at a position corresponding to the barrel holding portion 25. The voltage detection wires 23 are accommodated in the opening 55 of the detection wire routing groove 26.

The detection wire cover 27 is joined to an outer wall of the front wall 33A via detection wire cover hinges 35 (an example of a hinge). The detection wire cover 27 is configured to be rotated about the detection wire cover hinges 35, thereby covering the detection wire routing groove 26 and the barrel holding portion 25 from above. Thus, the detection wire cover 27 is configured to cover the voltage detection wire 23 accommodated in the detection wire routing groove 26 and the barrel holding portion 25 from above (see FIG. 6).

A main joint protrusion 37 (an example of a joint portion) and a main joint receiving portion 38 (an example of the joint portion) for joining adjacent joint units 18 together are formed on the right and left sides, respectively, of the barrel holding portion 25. When the main joint protrusion 37 of a joint unit 18 is fitted into the main joint receiving portion 38 of an adjacent joint unit 18, the main joint protrusion 37 and the main joint receiving portion 38 engage with each other, and thus the two joint units 18 are joined together.

Moreover, an auxiliary joint protrusion 40 (an example of the joint portion) and an auxiliary joint receiving portion 41 (an example of the joint portion) for joining adjacent busbar covers 17 together are formed on the right and left sides, respectively, of the busbar cover 17 at positions near a rear end portion of the busbar cover 17. When the auxiliary joint protrusion 40 of a busbar cover 17 is fitted into the auxiliary joint receiving portion 41 of an adjacent busbar cover 17, the auxiliary joint protrusion 40 and the auxiliary joint receiving portion 41 engage with each other, and thus the two busbar covers 17 are joined together.

Locking Structure for Busbar Cover 17

Figure 8:
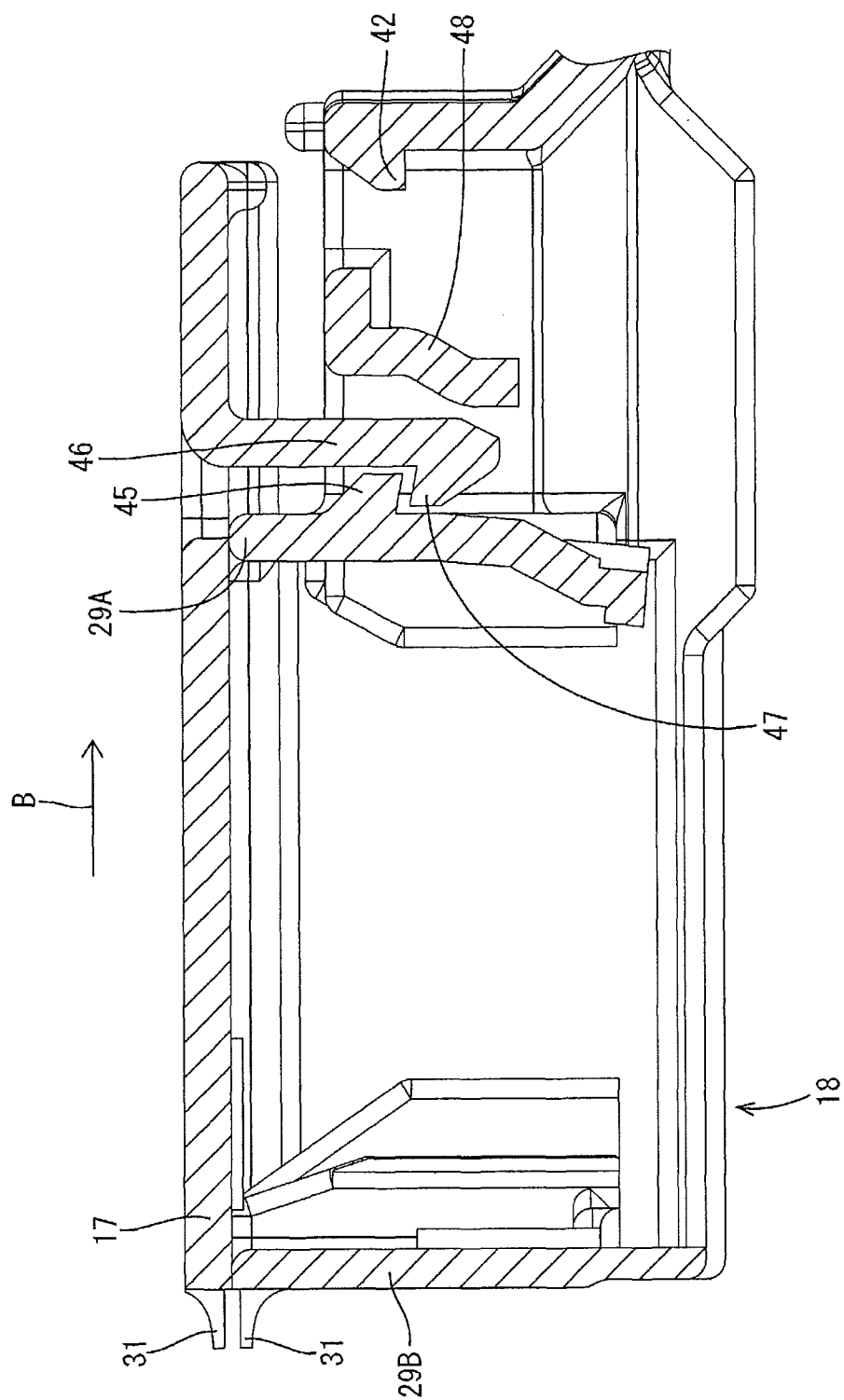
FIG. 8 is a cross-sectional view taken along line VIII-VIII in FIG. 9.
Figure 9:
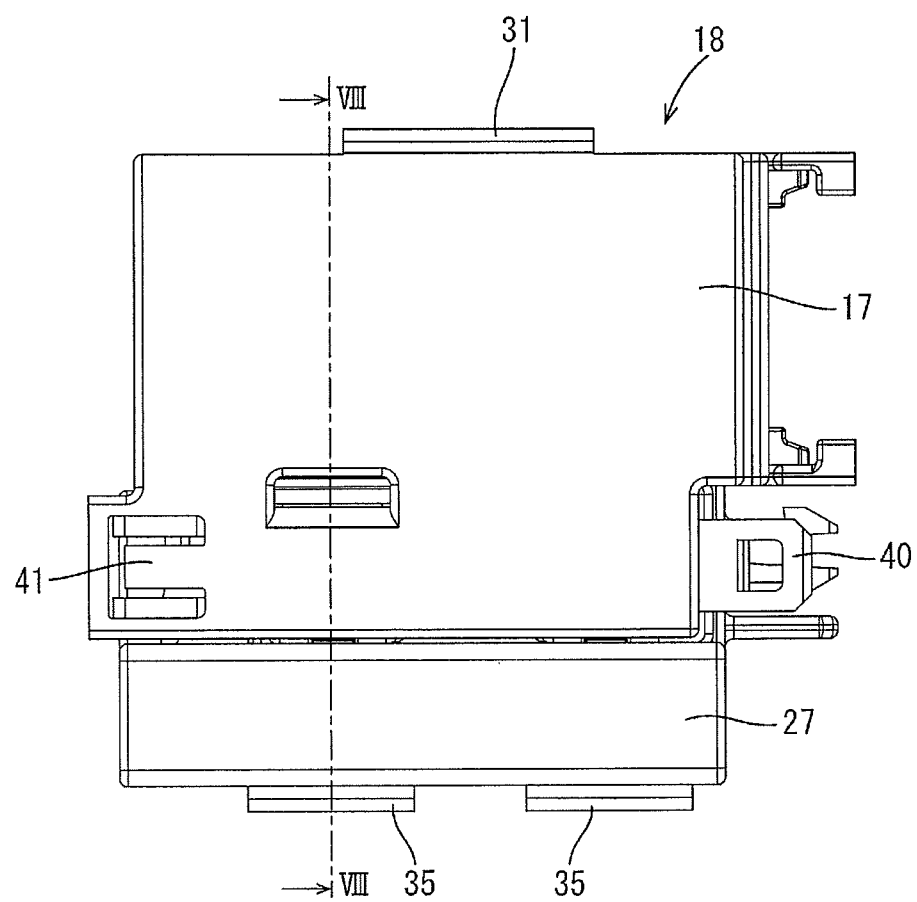
FIG. 9 is a plan view showing the joint unit in a state in which the detection wire cover and a busbar cover are closed.

As shown in FIGS. 2 and 8, a busbar cover engagement receiving portion 45 is formed protruding from an outer wall of the first peripheral wall 29A. The busbar cover engagement receiving portion 45 is located on the left side of the barrel holding portion 25, and engages with a busbar cover engagement portion 46 formed on the busbar cover 17.

On the other hand, as shown in FIG. 8, the busbar cover engagement portion 46 that is elastically deformable is formed on the busbar cover 17 at a position that corresponds to the busbar cover engagement receiving portion 45 in a state in which the busbar cover 17 covers the opening 28. The busbar cover engagement portion 46 is formed protruding substantially perpendicularly from a plate surface of the busbar cover 17. An engagement protrusion 47 is formed at a leading end portion of the busbar cover engagement portion 46 with the engagement protrusion 47 protruding toward the busbar cover engagement receiving portion 45. It should be noted that the detection wire cover 27 is omitted from FIG. 8 for convenience of explanation.

When the busbar cover 17 is attached so as to close the opening 28 of the accommodating portion 24 from above, the engagement protrusion 47 abuts against the busbar cover engagement receiving portion 45 from above, and thus the busbar cover engagement portion 46 elastically deforms. When the busbar cover 17 is moved further downward, the busbar cover engagement portion 46 surpasses the busbar cover engagement receiving portion 45 and thus recovers by deforming. Then, the busbar cover engagement receiving portion 45 and the engagement protrusion 47 of the busbar cover engagement portion 46 engage with each other. The busbar cover 17 is thus attached to the accommodating portion 24. Consequently, the busbar cover 17 covers the busbar 16 (see FIG. 9).

As shown in FIGS. 2 and 8, an elastic contact piece 48 that is elastically deformable is formed in the joint unit 18. The elastic contact piece 48 is located at a position that opposes the busbar cover engagement receiving portion 45, and extends downward. The elastic contact piece 48 is formed being bent in such a manner that its distance from the busbar cover engagement receiving portion 45 decreases toward its lower end.

As shown in FIG. 8, the elastic contact piece 48 is configured such that when a force acting in a disengagement direction (direction indicated by arrow B in FIG. 8) in which the busbar cover engagement portion 46 and the busbar cover engagement receiving portion 45 disengage from each other is applied to the busbar cover 17, the elastic contact piece 48 abuts against the busbar cover engagement portion 46 from a direction opposite to the disengagement direction. Thus, disengagement of the busbar cover engagement portion 46 and the busbar cover engagement receiving portion 45 is suppressed.

Locking Structure for Detection Wire Cover 27

As shown in FIG. 2, detection wire cover engagement receiving portions 42 (an example of a cover engagement receiving portion) are formed protruding from an outer wall of the rear wall 33B. The detection wire cover engagement receiving portions 42 are located on the left and right sides, respectively, of the barrel holding portion 25, and engage with corresponding detection wire cover engagement portions 43 (an example of a cover engagement portion) formed on the detection wire cover 27.

Figure 5:
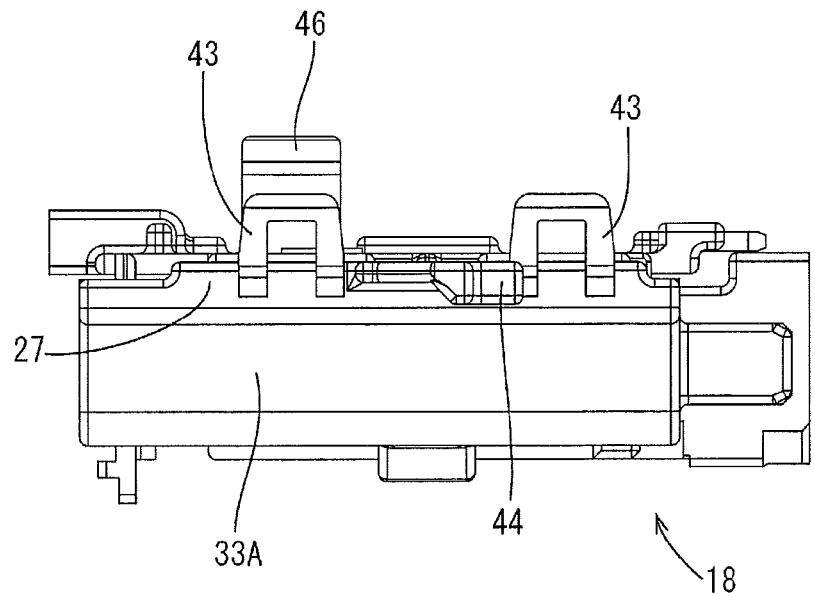
FIG. 5 is a front view showing the joint unit.
Figure 6:
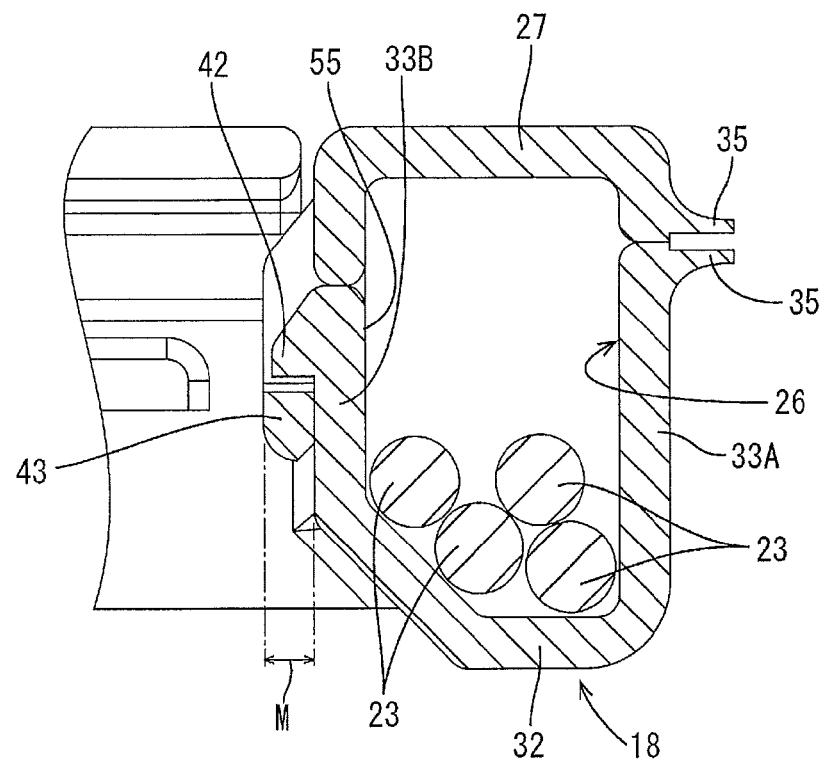
FIG. 6 is a cross-sectional view taken along line VI-VI in FIG. 3.

On the other hand, as shown in FIGS. 4 and 5, the detection wire cover engagement portions 43 that are elastically deformable are formed on the detection wire cover 27. The detection wire cover engagement portions 43 are located at respective positions that correspond to the detection wire cover engagement receiving portions 42 in a state in which the detection wire cover 27 covers the detection wire routing groove 26 and the barrel holding portion 25. The detection wire cover engagement portions 43 each have a frame shape. The detection wire cover engagement portions 43 are configured to elastically engage with the corresponding detection wire cover engagement receiving portions 42 by abutting against the detection wire cover engagement receiving portions 42 and thus elastically deforming, and then surpassing the detection wire cover engagement receiving portions 42 and thus recovering by deforming (see FIG. 6). It should be noted that the voltage detection wires 23 are shown in FIG. 6 for convenience of explanation.

Figure 7:
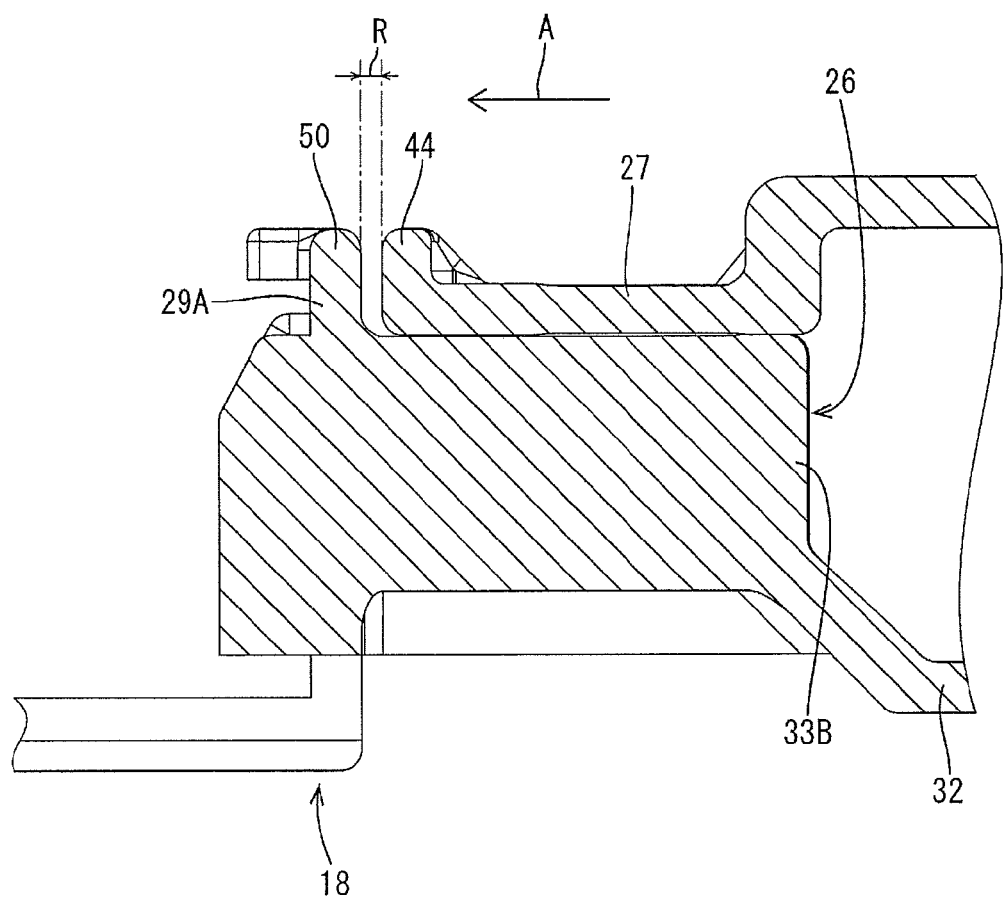
FIG. 7 is a cross-sectional view taken along line VII-VII in FIG. 3.

As shown in FIG. 7, the first peripheral wall 29A is formed intersecting a disengagement direction (direction indicated by arrow A in FIG. 7) in which the detection wire cover engagement receiving portions 42 disengage. In the present embodiment, a wall surface of the first peripheral wall 29A is formed perpendicularly to the disengagement direction. Moreover, as shown in FIG. 2, the first peripheral wall 29A is formed at a position forward (rearward in FIG. 2) of the detection wire cover engagement receiving portions 42 with respect to the disengagement direction. In the present embodiment, the first peripheral wall 29A is an example of an intersecting wall.

As shown in FIG. 7, a detection wire cover support portion 50 (an example of a cover support portion) is formed at an upper end portion of the first peripheral wall 29A. When a force acting in the disengagement direction, in which the detection wire cover engagement receiving portions 42 disengage, is applied to the detection wire cover 27, the detection wire cover support portion 50 abuts against the detection wire cover 27 from a direction opposite to the disengagement direction.

An abutment rib 44 is formed in a portion of the detection wire cover 27 that opposes the detection wire cover support portion 50. This abutment rib 44 is configured such that when a force is applied to the detection wire cover 27 in the disengagement direction (direction indicated by arrow A in FIG. 7), in which the detection wire cover engagement portions 43 and the detection wire cover engagement receiving portions 42 disengage from each other, the abutment rib 44 abuts against the upper end portion of the first peripheral wall 29A from the disengagement direction. The abutment rib 44 is formed protruding upward and also extending in a direction that intersects (in the present embodiment, a direction that is perpendicular to) the disengagement direction (see FIG. 3).

As shown in FIG. 7, in a state in which no force is applied to the detection wire cover 27 in the disengagement direction, a clearance R is formed between the detection wire cover support portion 50 and the abutment rib 44. The size of this clearance R is set to be smaller than an engagement margin M between each detection wire cover engagement portion 43 and the corresponding detection wire cover engagement receiving portion 42 (see FIG. 6).

Figure 3:
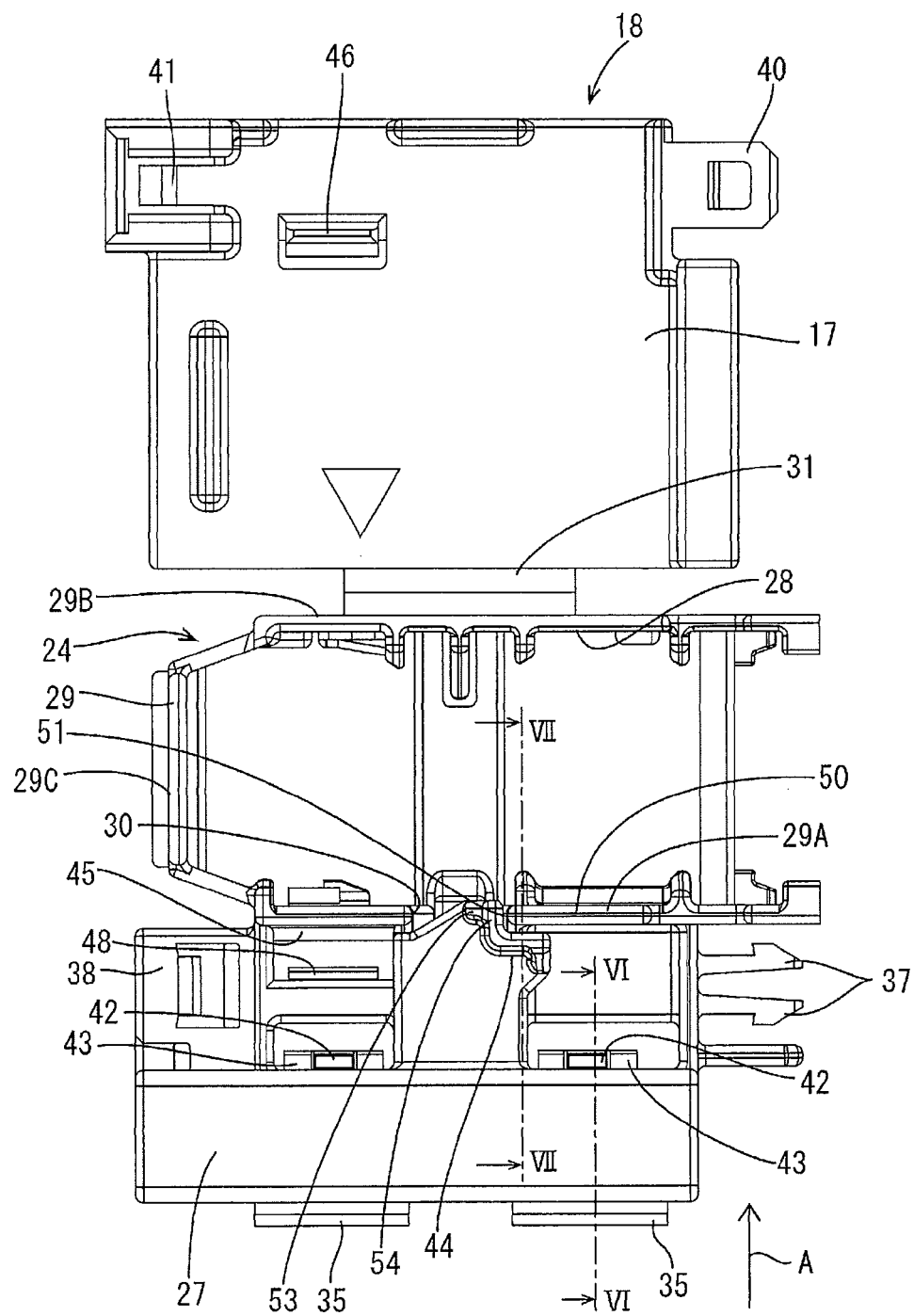
FIG. 3 is a plan view showing the joint unit in a state in which a detection wire cover is closed.

As shown in FIG. 3, a fitting portion 53 to be fitted into the rear notch 30 is formed in the detection wire cover 27. A lip abutment rib 54 extending in the disengagement direction (direction indicated by arrow A in FIG. 3) is formed in the fitting portion 53. The lip abutment rib 54 abuts against a lip portion 51, of a pair of lip portions 51 of the rear notch 30, that is located on the right side in FIG. 3 when a force is applied in a direction that intersects the disengagement direction (in the present embodiment, a leftward direction in FIG. 3). A front end portion of the lip abutment rib 54 and a left end portion of the abutment rib 44 are joined together, and the lip abutment rib 54 and the abutment rib 44 form a substantially L shape as a whole.

Effects of Present Embodiment

Next, effects of the present embodiment will be described. In the present embodiment, the detection wire cover support portion 50, which abuts against the detection wire cover 27 from the direction opposite to the disengagement direction, in which the detection wire cover engagement portions 43 and the detection wire cover engagement receiving portions 42 disengage from each other, when a force is applied to the detection wire cover 27 in the disengagement direction, is formed in the insulation protector 15.

Thus, movement of the detection wire cover 27 in the disengagement direction, in which the detection wire cover engagement portions 43 and the detection wire cover engagement receiving portions 42 disengage from each other, can be suppressed. Accordingly, disengagement of the detection wire cover engagement portions 43 and the detection wire cover engagement receiving portions 42 is suppressed, and thus detachment of the detection wire cover 27 from the insulation protector 15 can be suppressed.

Moreover, in the present embodiment, the abutment rib 44, which extends in the direction that intersects the disengagement direction and which abuts against the detection wire cover support portion 50 when a force is applied to the detection wire cover 27 in the disengagement direction, is formed in the portion of the detection wire cover 27 that opposes the detection wire cover support portion 50. Thus, when a force is applied to the detection wire cover 27 in the disengagement direction, in which the detection wire cover engagement portions 43 and the detection wire cover engagement receiving portions 42 disengage from each other, the abutment rib 44 formed in the detection wire cover 27 abuts against the detection wire cover support portion 50. This abutment rib 44 can suppress deformation of the detection wire cover 27 in the case where the detection wire cover support portion 50 and the detection wire cover 27 abut against each other. As a result, disengagement of the detection wire cover engagement portions 43 and the detection wire cover engagement receiving portions 42 due to deformation of the detection wire cover 27 can be suppressed, and thus detachment of the detection wire cover 27 from the insulation protector 15 can be suppressed even more.

Moreover, in the present embodiment, in a state in which no force is applied to the detection wire cover 27 in the disengagement direction, the clearance R is formed between the detection wire cover support portion 50 and the abutment rib 44, and the size of the clearance R is set to be smaller than the engagement margin M between each detection wire cover engagement portion 43 and the corresponding detection wire cover engagement receiving portion 42. Thus, since the clearance R is formed between the detection wire cover support portion 50 and the abutment rib 44 in the state in which no force is applied to the detection wire cover 27 in the disengagement direction, the detection wire cover 27 and the insulation protector 15 can be easily assembled together.

On the other hand, when a force is applied to the detection wire cover 27 in the disengagement direction, the detection wire cover 27 moves toward the detection wire cover support portion 50 for a distance corresponding to the clearance R. Then, the detection wire cover support portion 50 and the abutment rib 44 abut against each other. At this time, since the size of the clearance R is set to be smaller than the engagement margin M between each detection wire cover engagement portion 43 and the corresponding detection wire cover engagement receiving portion 42, disengagement of the detection wire cover engagement portions 43 and the detection wire cover engagement receiving portions 42 is suppressed even in a state in which the detection wire cover support portion 50 and the abutment rib 44 abut against each other.

Moreover, in the present embodiment, the first peripheral wall 29A intersecting the disengagement direction is provided in the insulation protector 15 at a position that is forward of the detection wire cover engagement receiving portions 42 with respect to the disengagement direction, and the detection wire cover support portion 50 is formed in the first peripheral wall 29A. Since the detection wire cover support portion 50 is formed at a position that is forward of the detection wire cover engagement receiving portions 42 with respect to the disengagement direction, even if a force is applied to the detection wire cover 27 in the disengagement direction and causes the detection wire cover 27 and the detection wire cover support portion 50 to abut against each other, deformation of the detection wire cover engagement receiving portions 42 under the force can be reliably suppressed. Accordingly, disengagement of the detection wire cover engagement portions 43 and the detection wire cover engagement receiving portions 42 is reliably suppressed, and thus detachment of the detection wire cover 27 from the insulation protector 15 can be reliably suppressed.

Moreover, according to the present embodiment, the rear notch 30 is provided in the first peripheral wall 29A, the fitting portion 53 to be fitted into the rear notch 30 is provided in the detection wire cover 27, and the lip abutment rib 54, which extends in the disengagement direction and which abuts against one of the pair of lip portions 51 constituting the rear notch 30 of the first peripheral wall 29A when a force is applied to the detection wire cover 27 in the direction that intersects the disengagement direction, is formed in the fitting portion 53. Thus, when a force is applied to the detection wire cover 27 in the direction that intersects the disengagement direction, movement of the detection wire cover 27 in the direction that intersects the disengagement direction is suppressed. Accordingly, application of the force to the detection wire cover engagement portions 43 and the detection wire cover engagement receiving portions 42 is suppressed, and thus disengagement of the detection wire cover engagement portions 43 and the detection wire cover engagement receiving portions 42 is suppressed.

Moreover, according to the present embodiment, the conductive member is the voltage detection wires 23 that detect the voltage of at least one of the plurality of power storage devices 11, and thus protrusion of the voltage detection wires 23 from the insulation protector 15 is suppressed by the detection wire cover 27 covering the voltage detection wires 23.

Moreover, according to the present embodiment, the insulation protector 15 and the detection wire cover 27 are formed integrally with each other via the detection wire cover hinges 35. Thus, the number of components of the wiring module 10 can be reduced.

Moreover, the insulation protector 15 is configured by the plurality of joint units 18 being joined together by the main joint protrusions 37 and the main joint receiving portions 38 as well as the auxiliary joint protrusions 40 and the auxiliary joint receiving portions 41 in the direction in which the plurality of power storage devices 11 are lined up, and the detection wire cover engagement receiving portions 42 and the detection wire cover support portion 50 are formed in each of the plurality of joint units 18. Thus, the detection wire cover 27 is locked by the detection wire cover engagement receiving portions 42 that are formed in each joint unit 18, and also movement of the detection wire cover 27 in a direction in which it detaches from the insulation protector 15 is suppressed by the detection wire cover support portion 50 that is formed in each joint unit 18. Accordingly, the detection wire cover 27 is reliably locked at a plurality of positions, and thus detachment of the detection wire cover 27 from the insulation protector 15 can be reliably suppressed.

Other Embodiments

The present invention is not limited to the embodiment that has been explained by the foregoing description with reference to the drawings. For example, embodiments such as those described below are also embraced within the technical scope of the present invention.

(1) Although the voltage detection wires 23 are used as the conductive member according to the foregoing embodiment, the present invention is not limited to this. A configuration may also be adopted in which the conductive member is the busbars 16, and the cover is the busbar covers 17, or, or a configuration may be adopted in which the conductive member is thermistors that are connected to the storage devices 11 in a heat-transferring manner and lead wires that are led from those thermistors, and the cover is a cover that covers the thermistors and the lead wires. Any members can be selected as the conductive member and the cover as necessary.

(2) Although a configuration in which the clearance R is formed between the detection wire cover support portion 50 and the detection wire cover 27 in a state in which no force is applied to the detection wire cover 27 in the disengagement direction is adopted in the foregoing embodiment, a configuration may also be adopted in which the clearance R is not formed between the detection wire cover support portion 50 and the detection wire cover 27.

(3) A configuration may also be adopted in which a pair of lip abutment ribs 54 that respectively abut against the pair of lip portions 51 are formed in the fitting portion 53.

(4) The lip abutment rib 54 may be omitted.

(5) Although secondary batteries are used as the power storage devices 11 in the foregoing embodiment, the present invention is not limited to this. Capacitors or condensers may also be used as the power storage devices 11.

(6) Although a configuration in which the detection wire cover 27 is formed integrally with the insulation protector 15 via the detection wire cover hinges 35 is adopted in the foregoing embodiment, the present invention is not limited to this. The detection wire cover 27 may be a component that is separate from the insulation protector 15.

(7) Although a configuration in which the main joint protrusion 37 and the main joint receiving portion 38 as well as the auxiliary joint protrusion 40 and the auxiliary joint receiving portion 41 are provided integrally with each joint unit 18 is adopted in the foregoing embodiment, the present invention is not limited to this. A configuration may also be adopted in which the joint units 18 are joined together by joint portions that are formed separately from the joint units 18.

(8) Although a configuration in which the insulation protector 15 is formed by the plurality of joint units 18 being joined together is adopted in the foregoing embodiment, the present invention is not limited to this. The insulation protector 15 may be constituted by a single member that accommodates the plurality of busbars 16.

(9) Although a configuration in which the detection wire cover support portion 50 is formed in the first peripheral wall 29A is adopted in the foregoing embodiment, the present invention is not limited to this. The detection wire cover support portion 50 can be formed at any position in the insulation protector 15 as necessary.

LIST OF REFERENCE NUMERALS

10 Wiring module
11 Power storage device
12 Power storage device group
15 Insulation protector
18 Joint unit
23 Voltage detection wire (conductive member)
27 Detection wire cover (cover)
29A First peripheral wall (intersecting wall)
30 Rear notch (notch)
35 Detection wire cover hinge (hinge)
37 Main joint protrusion (joint portion)
38 Main joint receiving portion (joint portion)
40 Auxiliary joint portion (joint portion)
41 Auxiliary joint receiving portion (joint portion)
42 Detection wire cover engagement receiving portion (cover engagement receiving portion)
43 Detection wire cover engagement portion (cover engagement portion)
44 Abutment rib
50 Detection wire cover support portion (cover support portion)
51 Lip portion
53 Fitting portion
54 Lip abutment rib
55 Opening
R Clearance

The invention claimed is:

1. A wiring module configured to be attached to a power storage device group in which a plurality of power storage devices are lined up, the wiring module comprising:
   a conductive member configured to be connected to at least one of the plurality of power storage devices;
   an insulation protector that has an opening in which the conductive member is accommodated and that includes a cover engagement receiving portion; and
   a cover that is attached to the insulation protector and covers the conductive member and that includes a cover engagement portion that engages with the cover engagement receiving portion,
   wherein a cover support portion is formed in the insulation protector, the cover support portion abutting against the cover from a direction opposite to a disengagement direction in which the cover engagement portion and the cover engagement receiving portion disengage from each other, when a force is applied to the cover in the disengagement direction.

2. The wiring module according to claim 1, wherein an abutment rib is formed in a portion of the cover that opposes the cover support portion, the abutment rib extending in a direction that intersects the disengagement direction and abutting against the cover support portion when a force is applied to the cover in the disengagement direction.

3. The wiring module according to claim 2, wherein in a state in which no force is applied to the cover in the disengagement direction, a clearance is formed between the cover support portion and the abutment rib, and a size of the clearance is set to be smaller than an engagement margin between the cover engagement portion and the cover engagement receiving portion.

4. The wiring module according to claim 1, wherein the conductive member is a voltage detection wire that is configured to detect a voltage of at least one of the plurality of power storage devices.

5. The wiring module according to claim 1, wherein the insulation protector and the cover are formed integrally with each other via a hinge.

6. The wiring module according to claim 1, wherein the insulation protector has a plurality of joint units each having a joint portion, the resin protector is formed by the plurality of joint units being joined together by the joint portions in a direction in which the plurality of power storage devices are lined up, and the cover engagement portion and the cover support portion are formed in each of the plurality of joint units.

7. The wiring module according to claim 1, wherein an intersecting wall intersecting the disengagement direction is provided in the insulation protector at a position forward of the cover engagement receiving portion with respect to the disengagement direction, and the cover support portion is formed in the intersecting wall.

8. The wiring module according to claim 7, wherein a notch is provided in the intersecting wall, a fitting portion to be fitted into the notch is provided in the cover, and a lip abutment rib is formed in the fitting portion, the lip abutment rib extending in the disengagement direction and abutting against at least one of a pair of lip portions constituting the notch of the intersecting wall when a force is applied to the cover in a direction that intersects the disengagement direction.

9. The wiring module according to claim 8, wherein the conductive member is a voltage detection wire that is configured to detect a voltage of at least one of the plurality of power storage devices.

10. The wiring module according to claim 9, wherein the insulation protector and the cover are formed integrally with each other via a hinge.

11. The wiring module according to claim 10, wherein the insulation protector has a plurality of joint units each having a joint portion, the resin protector is formed by the plurality of joint units being joined together by the joint portions in a direction in which the plurality of power storage devices are lined up, and the cover engagement portion and the cover support portion are formed in each of the plurality of joint units.

* * * * *